United States Patent [19]

Mullen et al.

[11] Patent Number: 5,090,153
[45] Date of Patent: Feb. 25, 1992

[54] INSECT MONITORING SYSTEM

[75] Inventors: Michael A. Mullen; Henry A. Highland, both of Savannah, Ga.; Robert E. Taggart, Monterey; Bill W. Lingren, Salinas, both of Calif.

[73] Assignees: Trece, Inc., Salinas, Calif.; The United States of America as represented by the United States Department of Agriculture, Washington, D.C.

[21] Appl. No.: 660,668

[22] Filed: Feb. 25, 1991

[51] Int. Cl.⁵ ........................ A01M 1/14; A01M 1/02
[52] U.S. Cl. ........................................ 43/114; 43/121
[58] Field of Search .................. 43/114, 121, 107, 115, 43/121

[56] References Cited

U.S. PATENT DOCUMENTS 2,345,408  3/1944  Martin ..................... 43/107
2,997,806  8/1961  Duvall ..................... 43/121
3,968,590  7/1976  Kitterman ................. 43/114
4,263,740  4/1981  Hemsarth et al. .......... 43/114
4,761,912  8/1988  Dyer et al. ............... 43/121
4,793,093  12/1988 Gertile .................... 43/131

FOREIGN PATENT DOCUMENTS 1249931  2/1989  Canada ..................... 43/107

Primary Examiner—Richard K. Seidel
Assistant Examiner—Jeanne M. Elpel
Attorney, Agent, or Firm—Hana Dolezalova

[57] ABSTRACT

A lightweight, durable convenient, practical, versatile and efficient insect monitoring system and trap for capturing crawling and flying adult insect or larvae. The trap is a two-piece snap-on plastic unit which contains an adhesive to trap the insects and the food or pheromone to lure the insects to the trap. The trap is useful for protection of stored animal and plant products.

7 Claims, 5 Drawing Sheets

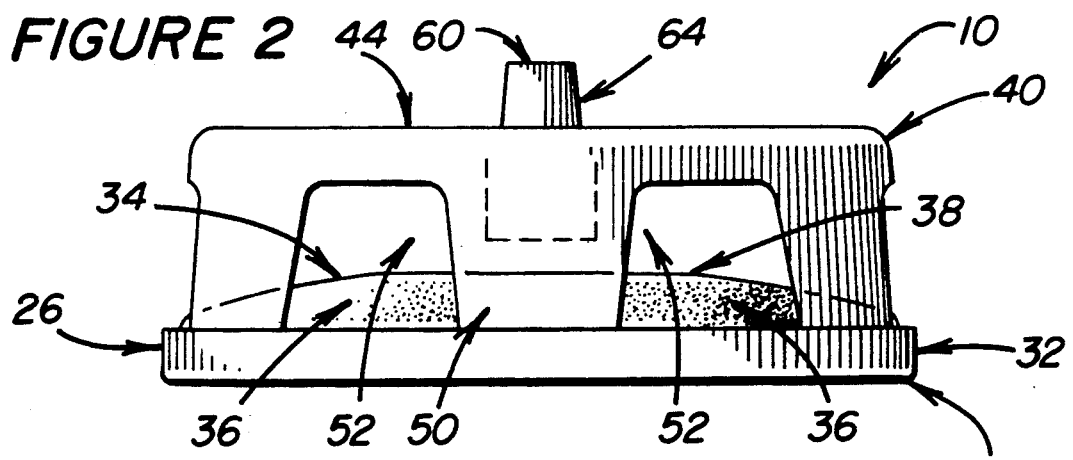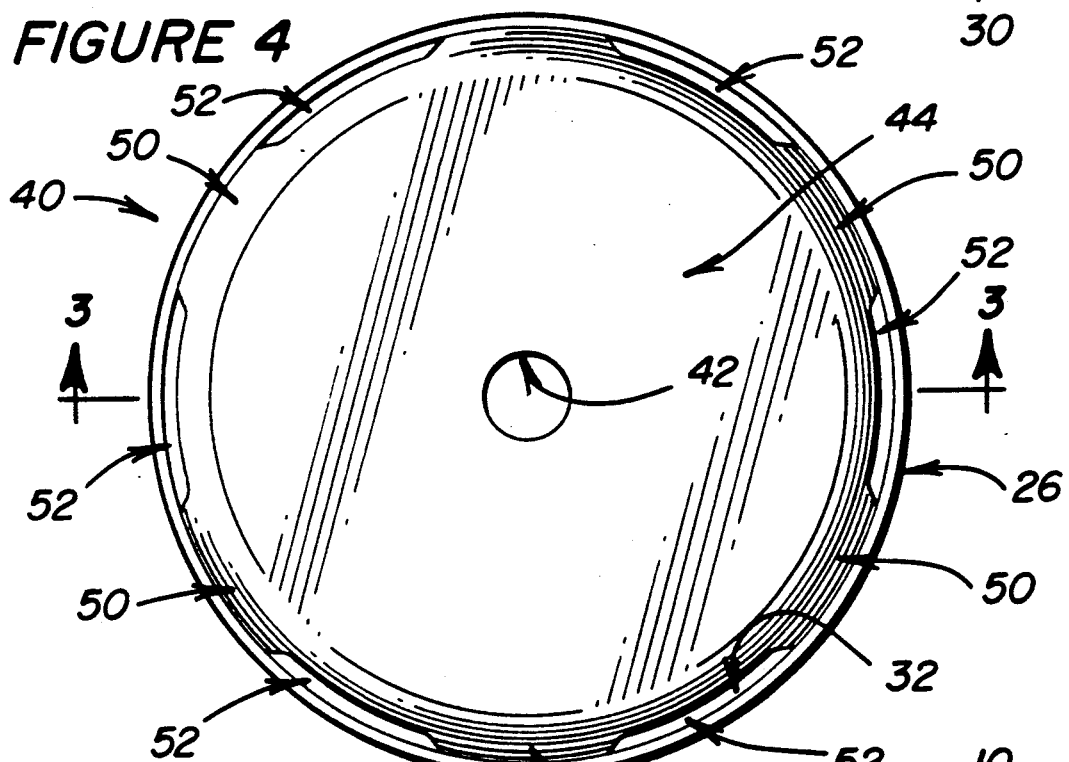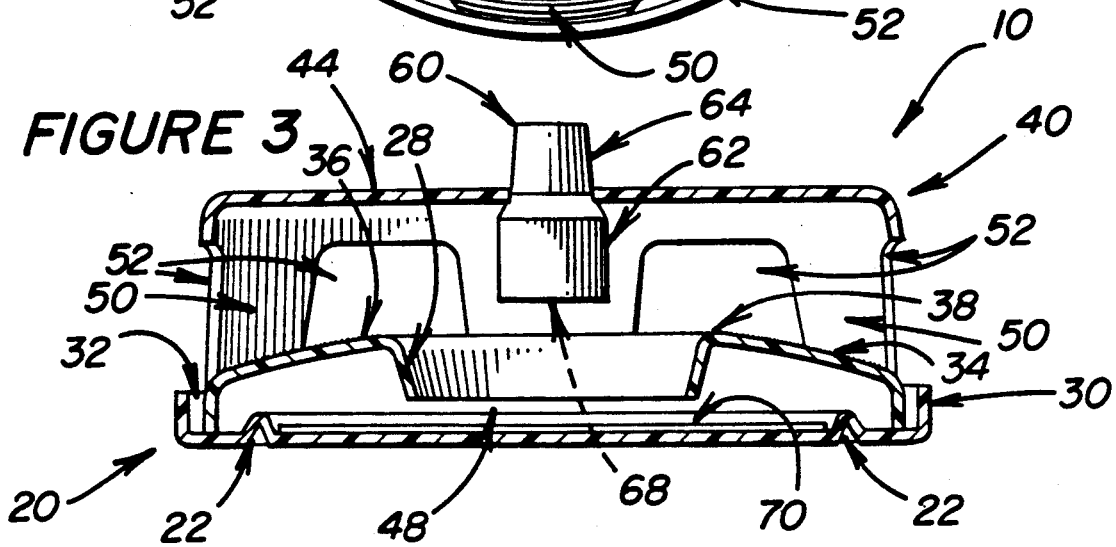

INSECT MONITORING SYSTEM

BACKGROUND OF THE INVENTION

1. Field of the Invention

This invention concerns a lightweight, durable, convenient, practical, versatile and efficient insect monitoring system and trap for capturing crawling and flying adult insect or larvae, in particular of small beetles. The trap is a two-piece snap on plastic unit which contains an adhesive to trap the insects and food or pheromone attractant to lure the insects to the trap. The trap is useful for protection of stored animal and plant products.

2. Background of the Invention

Small insects such as various species of beetles pose various economic problems for stored animal and plant products. Beetles, such as for example the cigarette beetle, *Lasioderma serricorne* are not only the leading parasite of dry leaf tobacco but also a typical pest which feeds on dry food such as coffee, cocoa, flour, corn meal, dried peppers, dried noodles and the grain in storage. The other beetles such as warehouse beetle-*Trogoderma variabile*, and khapra beetle, *Trogoderma granarium*, confused flour beetle, *Tribolium confusum* and redflour beetle *Tribolium castaneum*, sawtoothed grain beetle *Oryzaephilus surinamensis* and merchant grain beetle *Oryzaephilus mercator*, are all equally harmful.

It would therefore be extremely important and advantageous to have available a convenient and durable insect trap having specific means to attract and capture the insect. The trap could be also used as a monitoring system to determine the degree of insect infestation. The trap would preferably contain an attractant specific to the individual insect species which infest the specific product intended for human consumption. Such products as, for example, dry milk, flour, nuts, coffee, tea, dry foods, and processed cereals are commodities that must not, under any circumstances, contain living or dead insects or their larvae.

Many techniques for prevention of insect infestation of these commodities were devised recently. The methods for controlling stored commodity insects include treatments with pathogens, radiations, high-pressure treatment, the use of various chemicals and chemical regulators and recently developed insect sex pheromones and other behavior modifying semiochemicals which lure the insect to certain places. Various insect traps have been devised which lure the insects, poison the insects, suffocate the insects and/or remove insects from the stored products using any of the above means.

For example, U.S. Pat. No. 4,793,093 describes the feeding station for vermin which allows for ingress of the vermin to the trap to feed on a poisoned bait held at a central portion of the trap. The trap has side openings for the entrance of the insect and for an exit of the insect after it feeds on the bait. Presumably, after feeding on the bait the insects eventually die due to poisoning. However, the use of such trap for stored product insects would not be acceptable for protection of stored products because the insects would be poisoned. Consequently, whether alive or dead it would contain in its body the poison which could be dangerous and harmful to human beings. Also, the insect presumably would leave the trap and could conceivably return to the stored product and die there. That would not only contaminate the food with poison but it would also spoil the stored product and prevent it from using as a human food. The feeding station of U.S. Pat. No. 4,793,093 is thus completely unsuitable for use an as insect trap in protection of stored products.

U.S. Pat. No. 4,581,845 describes the suffocation type insect trap with pheromone and/or grain oils as attractants. The described trap is made of corrugated cardboard. The corrugations, which are oriented diagonally, form the spacing tunnels which tunnels are used as the ingress entrance for the insects. The corrugation tunnels lead to the central portion of the trap where the pheromone is stored over a cup or pitfall and a grain oil is contained in the cup. The insect is attracted toward the pheromone and food oil lure, and while it tries to get to it, it falls into the pitfall. The primary disadvantage of this trap is that it is made of the corrugated paper cardboard and that the paper corrugations form the only means for insect entrance into the trap. Since the cardboard is not very pressure resistant, in many instances it can get crushed or smashed so that the ingress of the insect into the trap is prevented. That is particularly true when these traps are packed, transported, stored and used under various conditions. Moreover, when such trap is stored and used in humid conditions it may lose its form and shape, the corrugation forming glue may get moist, deactivate and collapse and not only the ingress of the insects under these conditions may be prevented but the pheromone lure would not be effective. The paper trap is also susceptible to destruction by the insect which feeds on paper and/or glue.

Many insects like to hide in the corrugations and, due to behavioral preferences, avoid the cup. To obtain an accurate census, the insects must be knocked out of the corrugations thus consuming extra time and possibly destroying the trap.

The current invention avoids all these disadvantages in that it provides a lightweight, durable, convenient, versatile, practical, cheap and efficient monitoring system and insect trap.

SUMMARY

One aspect of this invention is the new lightweight, durable, practical, versatile, convenient, cheap and efficient insect monitoring system and trap.

Another aspect of this invention is a non-toxic snap-on two-pieces plastic monitoring system and trap.

Still another aspect of this invention is the use of the trap as a non-poisonous insect monitoring system which is useful in detecting and monitoring the population and infestation of stored animal and plant products and/or in mass capturing the insect.

BRIEF DESCRIPTION OF DRAWINGS

FIG. 2 is a side view of an assembled trap.

FIG. 3 is a cross sectional view of the assembled trap taken along line 3—3.

FIG. 4 is an overhead view of the assembled trap.

DETAILED DESCRIPTION OF THE INVENTION

Figure 1:
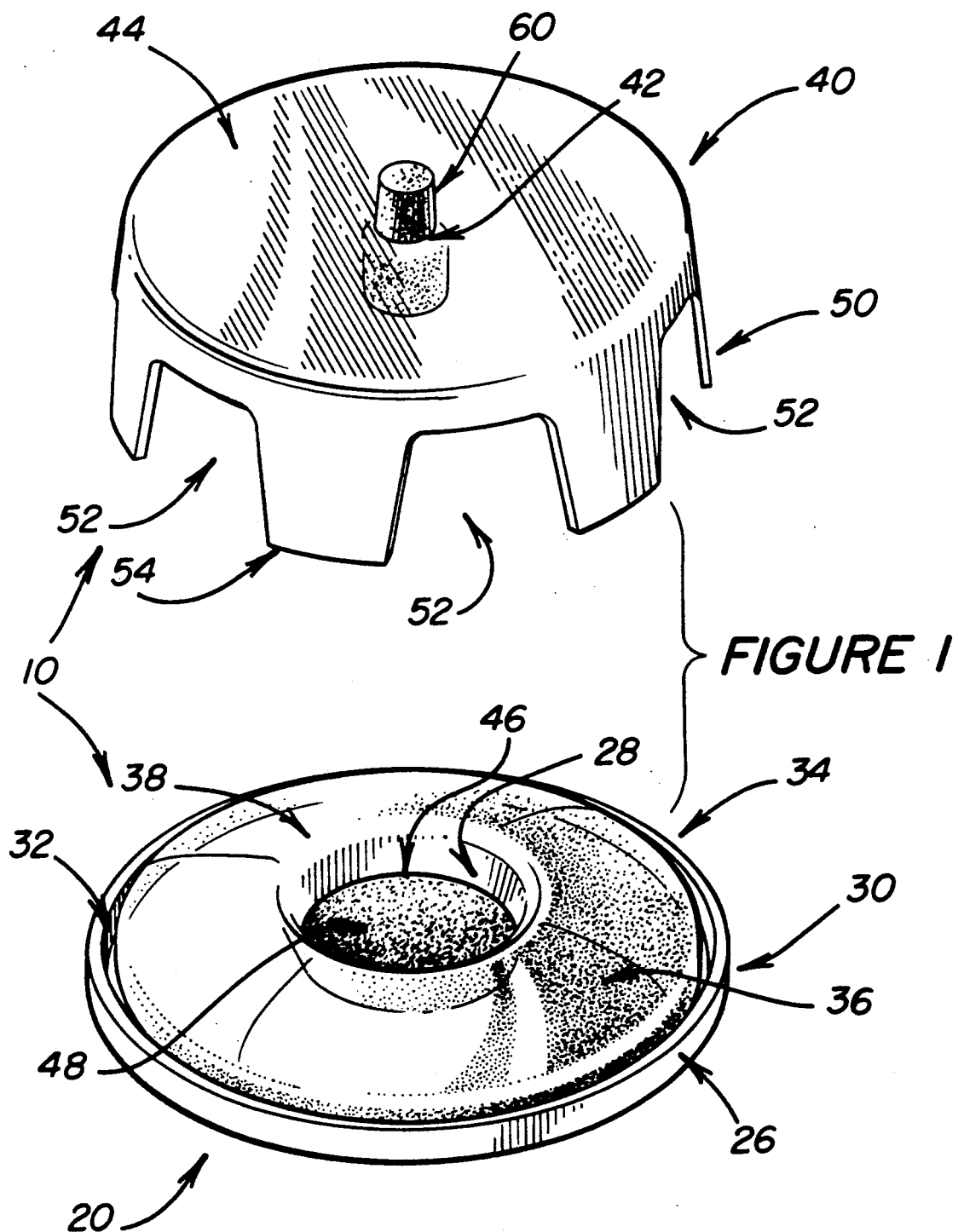
FIG. 1 is a perspective view of monitoring system and a preferred embodiment of this invention.

FIGS. 1-12 illustrate the preferred embodiment of the current invention. Trap 10 comprises of two easily snap-on sections 40 and 20. The trap is made of light but durable plastic which is preferably translucent to allow the monitor to see how many insects are inside and/or to change the adhesive pad or glue of the bottom section 20 with. The bottom section 20 comprises of bottom lid 30 with insect receiving surface with inner boundary (dome) a mounted dome-like structure looming over the adhesive pad or tray in the bottom of the insect well, which pad is attached to the bottom lid.

The adhesive may be made of any material which will effectively hold the insect and prevent it from crawling, walking, or flying away. The adhesive pad or tray insert is removable or exchangeable. Thus when the trap becomes too full, the bottom lid 30 can be removed and the adhesive pad 70 may be removed or exchanged. This feature is important particularly for monitoring the number of insects and/or degree of infestation. The adhesive pad may be, for example exchanged on a daily, weekly or monthly basis to provide information on whether or not there is an infestation and what the degree of the infestation is. Or, the trap may be used to capture the insect to eliminate the infestation. The trap size, material and shape allows the use of the trap anywhere regardless of the environment or weather. It is made of completely non-toxic molded plastic material. There is no known insect which would eat and digest the plastic material. The material is safe to be used even in instances where the trap is placed inside the stored product. Moreover, the used plastic is reasonably hard so that it is break-proof and does not deteriorate or disintegrate in humid, dry, hot or cold weather.

The upper section 40 comprises of top housing having an opening to hold a rubber septa containing the lure or pheromone and side openings to allow the insect pursuing the food lure or pheromone to enter. The septa is preferably made of rubber or some other porous material which allows the pheromone to be absorbed, bonded, soaked into it or be stored there in a dry or wet form. The septa is removable and replaceable. Until the trap is aotually used, and depending for which insect it is used, the septa is provided in sealed envelope, which protects the pheromone or other lure from evaporation. In this way the trap and the septa containing the lure have almost unlimited shelf life utility and versatility. Since the various specific pheromones and lures may be supplied and or used for various insects, the current trap is very versatile, practical and economical.

The lure may be any chemical compound or food which will attract the insect. Thus, the lure may be a specific male or female synthetic or natural sex hormone (pheromone), and behavior modifying semiochemicals, the aggregation pheromones or plain or oil-based food attractant, and it may be used alone or it may be a mixture of two or more attractants. While the sex pheromones would preferably be used to lure the adult insect, the food attractant would preferably be used to lure the larvae. The mixture of both would then be used to detect and trap both adult insect and larvae.

The traps would be preferably used in warehouses or storage places for both a continuous monitoring system and also for trapping the insect. Because of their non-toxic nature, the traps could be placed near to or inside the stored product without endangering the quality and safety of the product.

The new trap is more efficient in capturing insect than other existing traps.

DETAILED DESCRIPTION OF DRAWINGS

FIG. 1 illustrates the perspective view of the disassembled trap 10. The upper section 40 has the middle opening 42 into which the septa container 60 holding the pheromone or other lure is inserted. The top 44 which is the upper section of the top housing 40 is flat or slightly bended. The whole top housing unit 40 is made of one piece of light and durable plastic material. Side wall of the top housing 40 forms tongues 50 interspersed with openings 52 serving as an entrance point for flying and crawling insects. Lower end or edge 54 of the wall 50 fits tightly into the groove 32 between the outer wall 36 of the dome 34 and the rim 26 of the lid 30 of the bottom section 20. The groove 32 is a narrow slit located in between the rim 26 of the bottom lid 30 and the crawling dome 34. The rim is narrow enough to receive the wall 50 and hold it tightly. The crawling dome 34 serves as crawling surface for entrance of insect to the trap 10. The dome 34 is made of light translucent hard plastic material which has roughed and grained outside surface 36 to permit the insect to crawl or walk toward the circular edge 38 of the dome 34 placed in close proximity of the lower portion 64 of the septa 60 containing the lure 68. The dome has a downward and inward sloped smooth wall 28. The circular edge 38 of the dome 34 is the border between the dome 33 and downward inward sloped wall 28. The wall 28 has a cut-off middle section 46 which forms a well over the adhesive pad 70 into which well the insect falls. Contrary to the dome surface, the wall 28 has a smooth and polished surface which causes the insect to slide toward the well 48 and fall into it. The smooth surface of the wall 28 also prevents the insect from crawling up the wall or getting away.

At the bottom of well 48, there is an adhesive pad 70 made of a glue or some such other sticky material which will stick to the insect, trap it and prevent it from leaving.

FIG. 2 is the side view of the assembled trap 10. The bottom lid 30 with dome 34, only partly visible because it is situated inside of the top housing 40 snapped via its tongues 50 into the groove 32 (not seen in FIG. 2). The side wall tongues 50 of the top housing 40 are interspaced in regular intervals with the openings 52 to permit the entrance of the insect into the trap 10 and its walking or crawling on the surface 36 of the dome 34 toward the circular edge 38. The septa 60, in this case, having visible only its upper portion 64, is positioned in the middle of the upper section 44 of the top housing 40.

FIG. 3 is the cross sectional view of the assembled trap 10 taken along the line 3—3 of FIG. 4. The top housing 40 is snapped into the rim 32 of the bottom lid 30 via its wall 50. Openings 52 form entrances for insect along the rim 32 of the bottom lid 30. The tongues 50 interspaced with openings 52 are inserted in the groove 32 between the bottom lid 30 and the dome 34. In the assembled trap 10, the dome 34 is located inside of the top housing 40. The dome 34 raises toward the middle of the top housing where the septa 60 is mounted via the middle opening 42. The lower portion 64 of the septa 60 contains the lure 68 in dry or moist form. The circular edge 38 of the dome 34 is thus in close proximity of the lower portion 64 of the septa 60, i.e., very close to the lure 68.

When the insects crawls or flies through the openings 52 on the rough surface 36 of the dome 34 toward the lure 68, it ends up at the edge 38 surrounding the smooth wall 28 and when it further tries to get to the lure 68, it begins to slide on the smooth surface of the wall 28 toward the well 48. While it is possible that some insect may simply fly in and out again through the trap openings, large numbers of insects eventually fall into the well 48 of which bottom is formed by adhesive pad 70. As pointed out before, the adhesive pad is either glue or any other sticky substance and the insect which becomes attracted to the lure, falls down into the well and sticks to the adhesive pad 70.

Adhesive pad 70 is usually a circular pad placed at the upper and inner side 24 of the bottom lid 30. The upper inner side 24 of the bottom lid 30 forms a circular ridge 22 which holds the adhesive pad 70 within. The adhesive pad 70 is removable, i.e., if is not attached onto the upper inner side 24 but it is only placed there and held in the position by the ridge 22. Thus, the adhesive pad 70 may be easily removed or exchanged by simply taking the used pad out and inserting the fresh one.

FIG. 4 is the overhead view of the assembled trap. It shows the pattern of the openings 52 interchanged with tongues 0 of the top housing 40. Openings 52 are cut in the regular intervals into the of the top housing 40. In this case, there are six openings 52 cut into the plastic section 44. Depending on the insect, there may be 2-20 openings of various sizes and shapes. Top housing 40 is preferably made of one piece bended to form the top upper section 44 and including tongues 50. However, in other embodiments, the top housing may be also formed by separate upper lid forming the upper section 44 and the circular wall having tongues 50 and openings 52. In this embodiment, the upper lid would snap-on the wall forming tongues 50 and the whole top housing would be attached to the bottom section as described above. The opening 42 holds the septa, not shown, containing the lure. The edge rim 26 of the bottom 30 surrounds the groove 32 into which the wall 50 of the top housing 40 is inserted.

Figure 5:
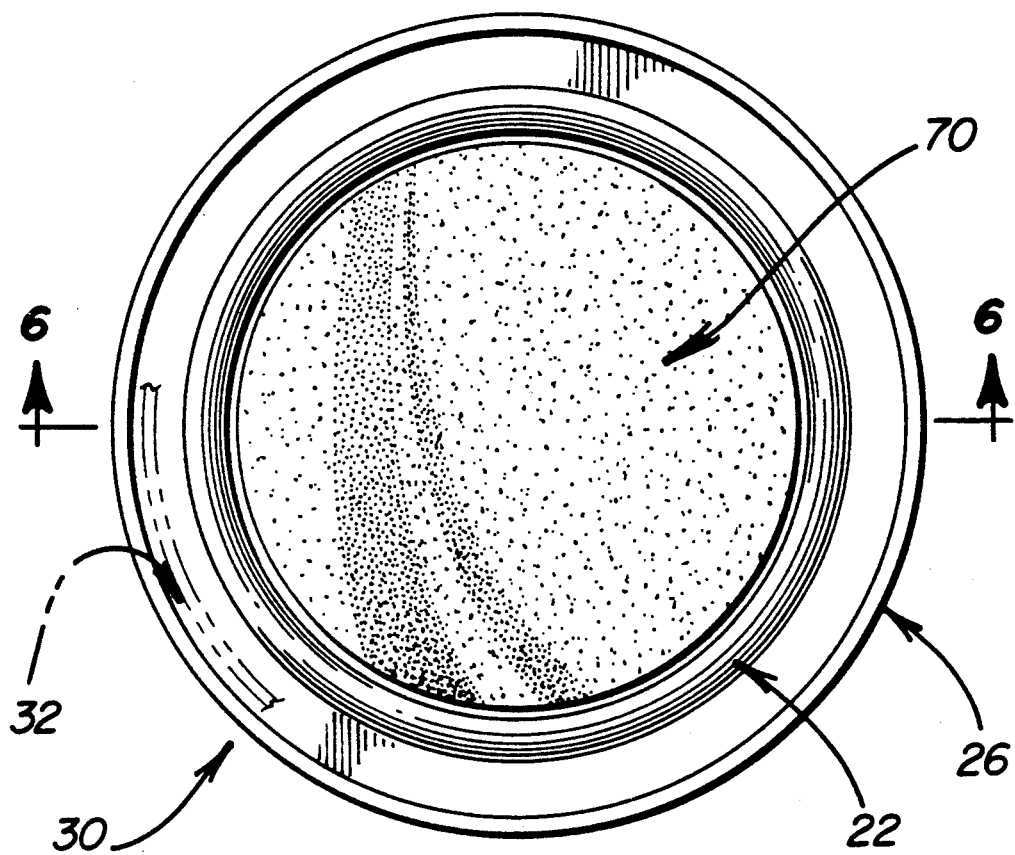
FIG. 5 is an overhead view of the bottom lid.

FIG. 5 is the overhead view of the bottom lid having circular shape with raised side 26. This view shows the groove 32 where the tongues 50 of the top housing 40 are inserted between the edge 26 and the dome 34, not shown in this figure. The ridge 22 surrounds the adhesive pad 70 and keeps it in place.

Figure 6:
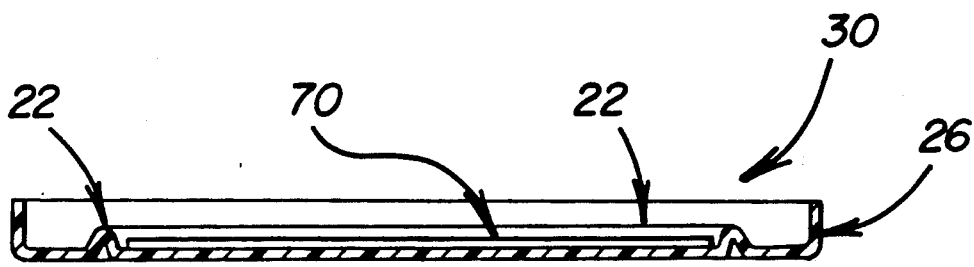
FIG. 6 is a cross sectional view of the bottom lid taken along line 6—6.

FIG. 6 is the cross-sectional view of the bottom lid 30 showing its dish like shape having the raised rim 26 which functions as snap-on ridge. The bottom lid 30 contains a circular ridge 22 which forms the shallow dish-like space where the adhesive pad 70 is placed.

Figure 7:
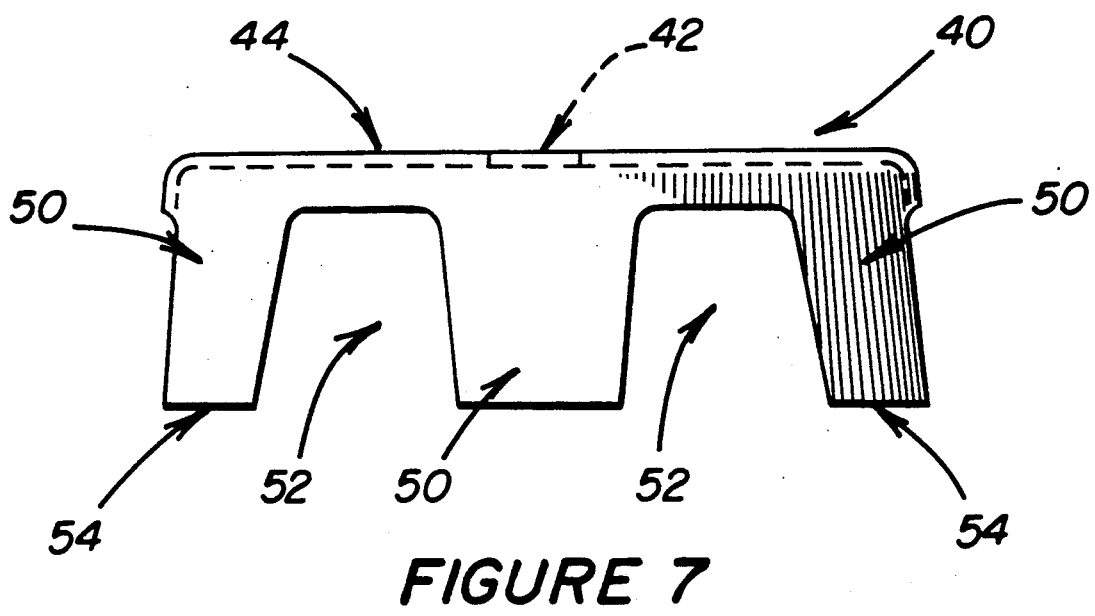
FIG. 7 is a side view the housing with openings for insects ingress.

FIG. 7 is the side view of the top housing 40, showing the top upper section 44 in relationship to the tongues 50, openings 52 and lower end 54 of the tongues 50 which end are inserted into the groove 32 of the bottom lid 30. The openings 42 house septa 60 (not shown).

Figure 8:
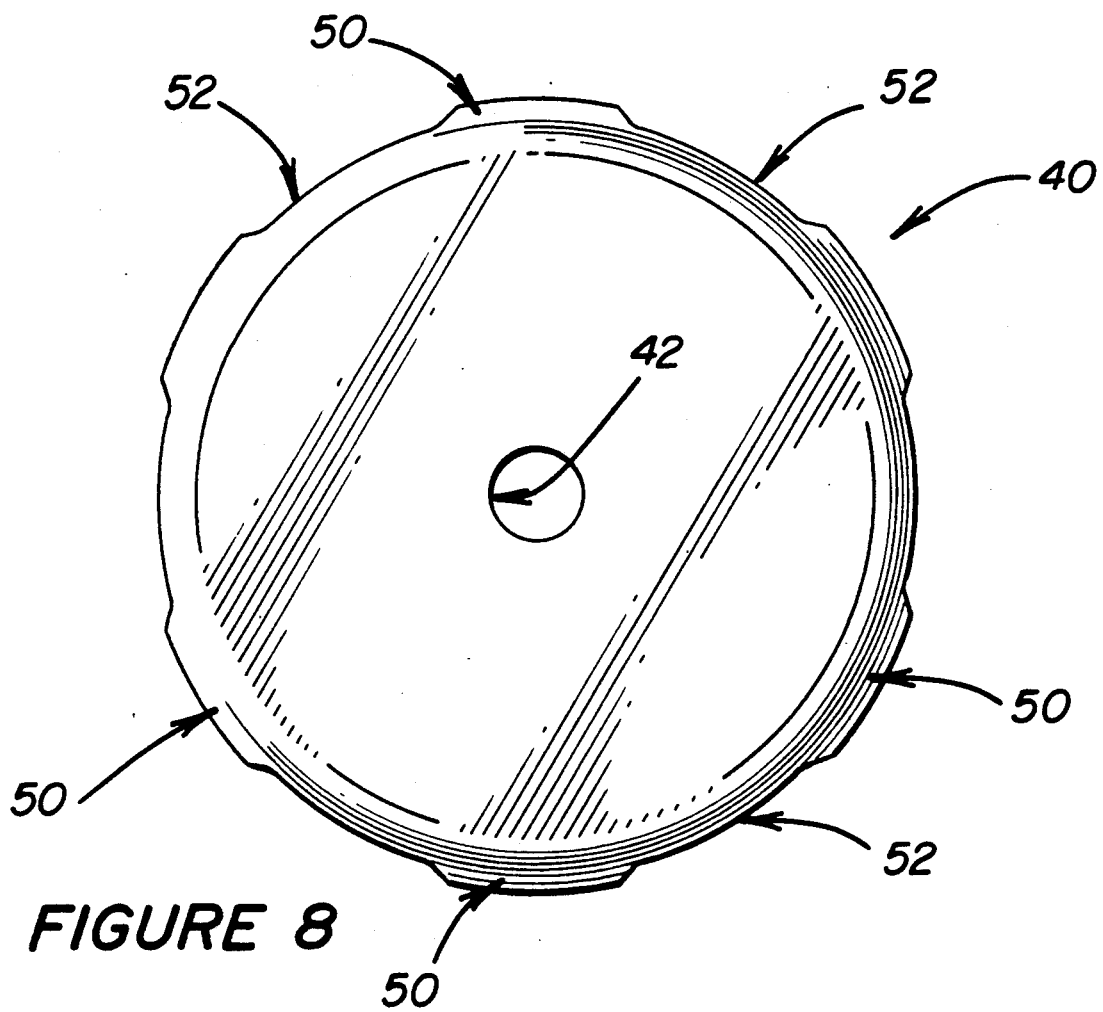
FIG. 8 is an overhead view of the top housing showing the placement of rubber septa.

FIG. 8 is an overhead view of top housing 40 showing the regularly interspaced the placement of openings 52 with the tongues 50. The opening 42 into which the lower portion 62 of the septa 60 containing lure 68 would be placed is seen in the middle of top housing 40.

Figure 9:
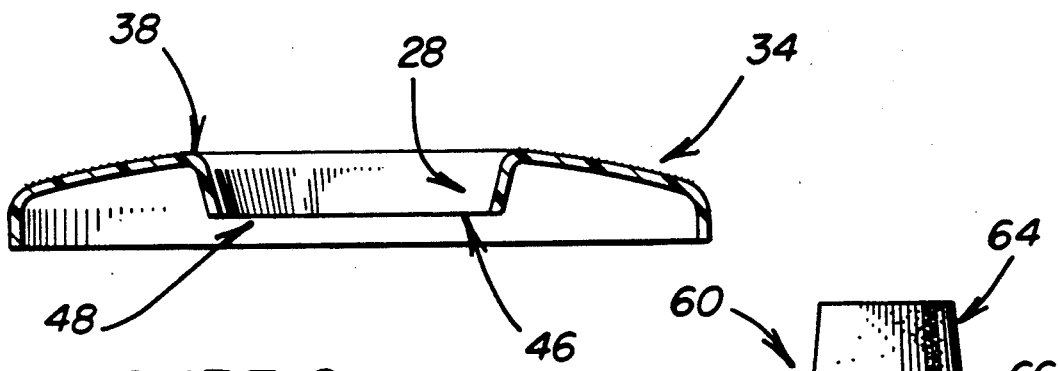
FIG. 9 is a cross sectional view taken across line 9—9 of the insect receiving surface with inner boundary (dome) also showing the well.

FIG. 9 is the cross-sectional view of the dome 34, showing the slight raise to the dome's circular edge 38, breaking point between the rough surface 36 and smooth wall 28 which turns sharply down toward the well 48 over the adhesive pad 70 (not shown in this figure). The lower edge 46 of the wall 28 forms the opening leading to the well 48. The relationship of the rough surface 36 of the dome 34 to the circular edge 38 which is the crossing point from the rough climbing surface 36 for insect to the smooth wall leading down toward the well 48 and the adhesive pad 70, on which the insect slides into the well 48.

Figure 10:
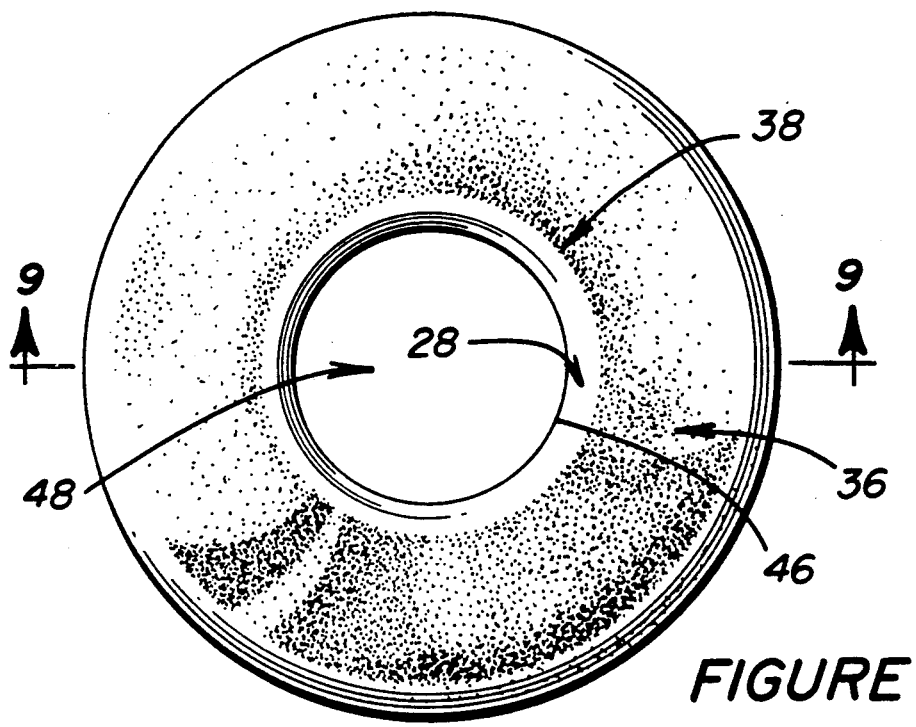
FIG. 10 is an overhead view of the insect well section.

FIG. 10 is the overview of the dome 34 showing the rough surface 36 in relation to the smooth wall 28 with the edge 38 as a breaking point between the two. The lower edge 46 of the wall 28 opens into the well 48.

Figure 11:
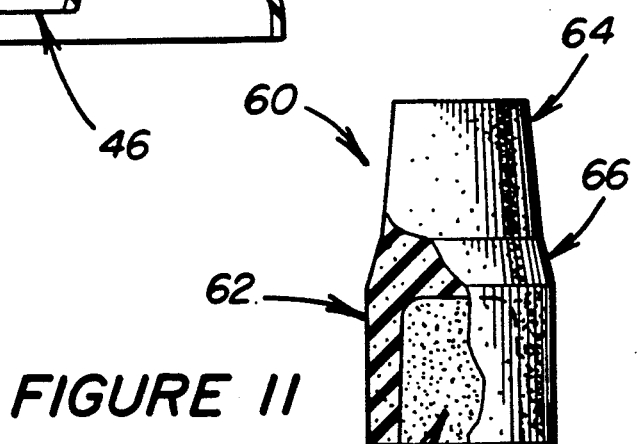
FIG. 11 is an enlarged side view of a septa container which holds the pheromone or other lure.

FIG. 11 is the side view of the septa 60 containing the lure 68. The septa 60 comprises the lower portion 64 which is generally larger in diameter than the upper section 62 in order to hold the septa in the opening 42 in the middle of the upper section 44 of the top housing 40. The septa 60 has the intermediate section 66 with frusto-conically shaped surface that is narrowed up to fit lightly into the opening 42 when the septa 60 is mounted into the top housing 40. The reason for the tight fit is that the lure is only supposed to be inside of the top house 40 and not to leak to the outside. Such leak could and would attract the insect to the outside of the trap and that would defeat the purpose of the lure to lure the insect into the trap.

Figure 12:
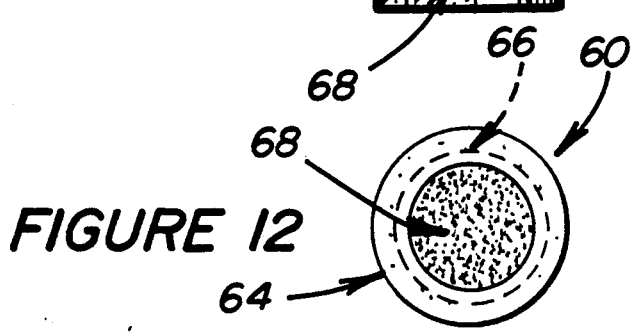
FIG. 12 is an enlarged bottom view of the septa container for the pheromone or the other lure.

FIG. 12 is the bottom view of the septa 60 showing the placement of the lure 68 inside the lower portion 64 of the septa. Also shown is the intermediate section 66. The bottom of the septa 60 faces toward the well 48 and toward the adhesive pad 70. As it is located centrally over the well, the lure attracts the insect to crawl, walk or climb on the rough surface 36 of the dome 34 covering the well 48 until it reaches the circular edge 38 of the dome 34 and still trying to reach the lure, the insect continues to get nearer to the lure 68, will cross the circular edge 38 and slide on the smooth wall 28 through the opening 46 leading to the well 48 and drop onto the adhesive pad 70.

The effectivity of the new trap, which is also called present invention trap has been tested in various conditons and compared to the effectivity of the other types of traps. The other traps were cardboard trap (prior art 1) and a plastic trap (prior art 2).

Prior art 1 carboard trap is basically the pitfall trap described in U.S. Pat. No. 4,581,845, constructed from several layers of ⅛" posterboard. Each layer is smaller than the next creating a pyramid from a seried of steps. At the top and in the center a recessed plastic cup serves as the pitfall. The plastic cup contains a small amount of wheat-oat oil that acts both as an attractant and as a killing agent. A pheromone impragnated rubber septa is placed on a small piece of aluminum foil in the center of the cup.

Prior art 2 trap is a plastic trap with a sticky trapping surface.

The testing was performed either in cha or in warehouses. The results of testing are shown in Tables 1 and 2 and described in Examples 1 and 2.

The present invention trap meets all the requirements for an effective trap. It is versatile in that is it effective against a wide variety of species. It is made of plastic and is durable with replaceable parts. Because of its construction it is practically escape proof. The rate of trap capture can be increased by removing obstructions ,near the pheromone dispenser. The design of the present invention trap allows the pheromone dispenser to protrude through the top, thus providing an unobstructed airflow for dispersal of the pheromone. Incorporation of an appropriate oil bait enhances the effect of the pheromone by providing a short distance attractant. This is especially important in a warehouse environment where there is little air movement to effect pheromone dispersal. Molecules of pheromone disperse slowly in closed environment and under some conditions they stick to absorbent surfaces which can then act as secondary pheromone emitters. This makes it difficult for insects to locate traps over long distances and as a result they tend to be attracted to the nearest trap. Proper use of pheromone traps will allow the warehouse attendant to locate patch infestations of insect that often occur in stored product environments.

The following examples illustrate testing conditions and results of the trap testing against various insects. Warehouse testing conditions are described in Example 1.

EXAMPLE 1

Warehouse Testing

This series of tests compared the current present invention trap, cardboard (prior art 1) trap and the plastic (prior art 2) trap. The prior art 1 trap is a pitfall cardboard trap and the prior art 2 is a plastic trap with a sticky trapping surface. Tests were conducted in large warehouse. Traps were placed on the floor near supports and around the walls. Tests were run for 16 weeks. Eleven traps of each type were used. The current traps used the rubber septa lure which was the same as prior art 1 lure. Initially, 1650 two week old adult *T. castaneum* adults were released every other week from 36 release points scattered around the warehouse. Insects were counted and removed from the traps before each additional release. Lures and traps were replaced every 8 weeks resulting in two replications over time.

Similar tests were conducted in smaller 15×5.6 m rooms. The tests compared the current present invention trap (prior art 1) and the prior art 2 traps. Two traps of each type were place around the perimeter of the room. The prior art 1 septa lure was used in the current trap. One thousand two week old unsexed *T. castaneum* adults were released at various points throughout the exposure room. Daily counts were made for 3 days. When possible, captured insects were removed from the traps after counting. Because of its construction, captured insects could not be removed from the prior art 2 trap. Only insects that were actually entrapped in the trap were counted. Insects that were in the trap, but were not entrapped were returned to the exposure room. At the end of each test the room was cleaned to remove insects that remained between replications. Traps were moved to different locations in the room between replications. Lures and traps were replaced monthly. Each test was replicated 16 times.

The results of the warehouse tests using the current present invention trap, the prior art 1 trap and the prior art 2 trap are shown in Table 1. Table 1 shows the results obtained in large warehouse test comparing present invention trap of the current invention, prior art 1 trap and prior art 2 trap for *T. castaneum*. As seen from Table 1, the current rap gives the largest number of caught insect. At week 2, for example, present invention trap captured 28 insect, prior art 1 trap captured 31 insects and prior art 2 trap captured only 6 insects. In 16 weeks, however, total captured insect by one present invention was 158 insects while prior art 1 trap captured 119 insects and prior art 2 trap captured only 36 insects. The present invention trap of this invention is thus almost 5 times more efficient than the prior art 2 trap and has approximately 25% higher effectivity than prior art 1 trap.

In the samll warehouse tests, the present invention trap was tested for its efficacy to capture *T. castaneum* and cmpared with the prior art 1 trap and the prior art 2 trap. The results are shown in Table 2. In all replications, the present invention trap was more efficient in capturing *T. castaneum* adults than either of the other traps ($P>0.0001$). The actual number of insects trapped by the prior art 1 and prior art 2 traps did not differ significantly. The present invention trap captured more than twice as many insect as prior art 1 or prior art 2 traps. While the prior art 1 trap attracted almost as many insects as the present invention trap, the prior art 1 trap did not entrap or capture the same number of insects. The insects thus entered the trap but could leave the trap once they entered. Because both traps used the same rubber septa lure impregnated with R,R and R,S of 4,8-dimethyl decanal, the difference in trap capture can be attributed only to present invention trap efficiency.

EXAMPLE 2

The current present invention trap was tested as described in Example 2 to see if it would capture other stored product species.

Maize weevil, *Sitophilus zeamaise* Motschulsky was chosen for testing in a small shed which contained corn. The shed was completely emptied of all corn residues, swept, and the seams were caulked. No pheromone was used and the only attractant was an oily bait made from ground corn that was extracted with pentane.

The present invention trap was effective capturing a total of 405 maize weevils in 3 traps in 10 days.

TABLE 1

| | NUMBER OF INSECTS CAUGHT | | |
|---|---|---|---|
| Week | Insect Trap Current Invention | Insect Trap Prior Art 1 | Insect Trap Prior Art 2 |
| 2 | 28 | 31 | 6 |
| 4 | 15 | 15 | 4 |
| 6 | 15 | 14 | 2 |
| 8 | 10 | 8 | 10 |
| 10 | 25 | 10 | 4 |
| 12 | 9 | 9 | 1 |
| 14 | 44 | 15 | 4 |
| 16 | 16 | 17 | 5 |

TABLE 2

| | NUMBER OF INSECTS CAUGHT | | |
|---|---|---|---|
| Replication | Insect Trap Current Invention | Insect Trap Prior Art 1 | Insect Trap Prior Art 2 |
| 1 | 94 | 12 | 37 |
| 2 | 75 | 40 | 25 |
| 3 | 82 | 41 | 19 |
| 4 | 26 | 58 | 28 |
| 5 | 80 | 24 | 21 |

TABLE 2-continued

| | NUMBER OF INSECTS CAUGHT | | |
|---|---|---|---|
| Replication | Insect Trap Current Invention | Insect Trap Prior Art 1 | Insect Trap Prior Art 2 |
| 6 | 99 | 52 | 37 |
| 7 | 145 | 96 | 46 |
| 8 | 46 | 12 | 23 |
| 9 | 102 | 54 | 27 |
| 10 | 37 | 10 | 24 |
| 11 | 53 | 26 | 26 |
| 12 | 49 | 5 | 12 |
| 13 | 94 | 10 | 23 |
| 14 | 88 | 9 | 31 |
| 15 | 115 | 12 | 58 |
| 16 | 41 | 10 | 26 |

What is claimed is:

1. An insect trap and monitoring system comprising plastic top housing,
   a bottom section;
   a septa;
   a bottom lid;
   a dome; and
   a well,
   whereby the top housing holds the septa containing an insect lure and the bottom section includes the bottom lid, the dome and the well wherein the dome and the well are positioned over an adhesive pad placed in the bottom lid.

2. The trap of claim 1 wherein the top housing includes multiple openings to allow the insect to enter the trap.

3. The trap of claim 2 wherein the top housing is snap-on attached to the bottom section and is positioned over the dome and the well and firmly inserted into a groove in the bottom lid.

4. The trap of claim 3 wherein the lure is a food or a pheromone.

5. The trap of claim 4 wherein the adhesive pad is exchangeable.

6. The trap of claim 5 wherein the lure is exchangeable.

7. The trap of claim 6 wherein the dome has a rough surface, a circular edge and downward inward smooth wall.

* * * * *